(12) United States Patent
Ooyama et al.

(10) Patent No.: US 8,092,204 B2
(45) Date of Patent: Jan. 10, 2012

(54) APPARATUS AND METHOD FOR INFLATION EXTRUSION MOLDING OF PRESSURE-SENSITIVE ADHESIVE SHEET

(75) Inventors: Kooki Ooyama, Ibaraki (JP); Shinsuke Ikishima, Ibaraki (JP); Naoto Hayashi, Ibaraki (JP); Tadao Torii, Ibaraki (JP); Toshihisa Yamane, Ibaraki (JP); Yuuki Katou, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 12/832,381

(22) Filed: Jul. 8, 2010

(65) Prior Publication Data

US 2011/0233827 A1    Sep. 29, 2011

(30) Foreign Application Priority Data

Mar. 26, 2010 (JP) ................................. 2010-073371
Jun. 18, 2010 (JP) ................................. 2010-139486

(51) Int. Cl.
*B29C 47/06* (2006.01)
*B29C 47/20* (2006.01)
*B29C 47/90* (2006.01)

(52) U.S. Cl. ..................... 425/72.1; 425/133.1; 425/377; 425/380; 425/462; 425/467

(58) Field of Classification Search .................. 425/72.1, 425/133.1, 377, 380, 462, 467
See application file for complete search history.

(56) References Cited

U.S. PATENT DOCUMENTS

| | | | | |
|---|---|---|---|---|
| 4,728,277 A | * | 3/1988 | Planeta | 425/72.1 |
| 5,912,022 A | * | 6/1999 | Sensen et al. | 425/72.1 |
| 2005/0029713 A1 | * | 2/2005 | Wedell et al. | 264/564 |
| 2007/0194501 A1 | | 8/2007 | Linkies et al. | |

FOREIGN PATENT DOCUMENTS

| | | | |
|---|---|---|---|
| GB | 939064 | * | 10/1963 |
| JP | 50-20578 | | 7/1975 |
| JP | 55-55831 A | | 4/1980 |

(Continued)

OTHER PUBLICATIONS

"Explanation of Circumstances Concerning Early Examination" dated Nov. 4, 2010, from corresponding Japanese Patent Application No. 2010-139486.

(Continued)

*Primary Examiner* — Yogendra Gupta
*Assistant Examiner* — Joseph Leyson
(74) *Attorney, Agent, or Firm* — Sughrue Mion, PLLC

(57) ABSTRACT

The present invention provides an apparatus for inflation extrusion molding of pressure-sensitive adhesive sheet, the apparatus including: one or a plurality of extruders; a die into which one or a plurality of resin materials including at least a resin material for forming a pressure-sensitive adhesive layer and extruded respectively from the extruders are respectively introduced and which extrudes from an ejection opening the resin materials into an inflated cylindrical shape having a predetermined diameter in accordance with an inflation method; and two stabilizers facing each other at a predetermined angle so as to upwardly approach each other, and defining a space therebetween through which the cylindrically-shaped resin materials extruded from the die are passed to be deformed into a pressure-sensitive adhesive sheet in a flattened elliptical shape having a predetermined width, in which the stabilizers each have a plurality of air floating portions each of which blows air toward the resin materials; and the stabilizers rotate in one direction around the central axis of the cylindrically-shaped resin materials.

2 Claims, 11 Drawing Sheets

FOREIGN PATENT DOCUMENTS

| | | |
|---|---|---|
| JP | 59-64330 A | 4/1984 |
| JP | 61-228934 A | 10/1986 |
| JP | 63-49613 B2 | 10/1988 |
| JP | 07-030347 Y2 | 7/1995 |
| JP | 2005-111980 A | 4/2005 |
| JP | 2007-526151 A | 9/2007 |

OTHER PUBLICATIONS

"Notice of Reasons for Rejection" dated Nov. 30, 2010, issued in corresponding Japanese Patent Application No. 2010-139486.

Office Action issued Aug. 10, 2011, in corresponding Chinese Utility Model Application No. 2011080500378970.

* cited by examiner

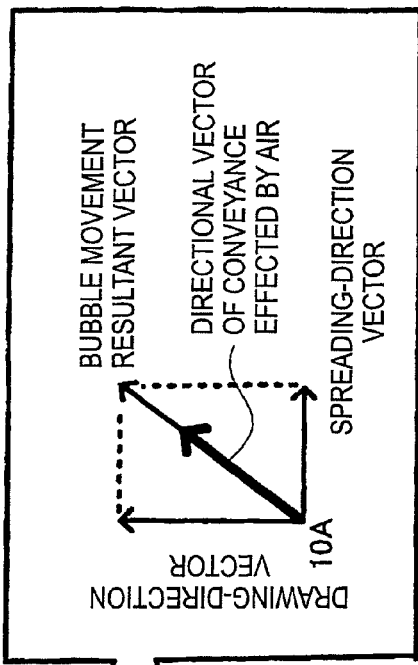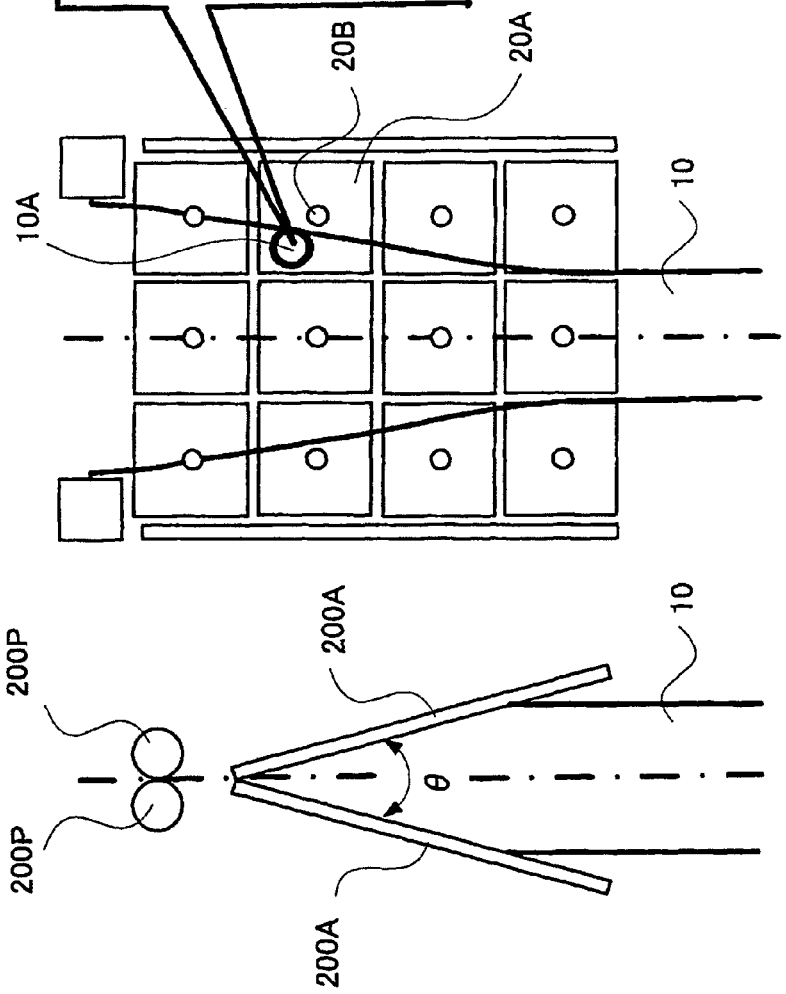

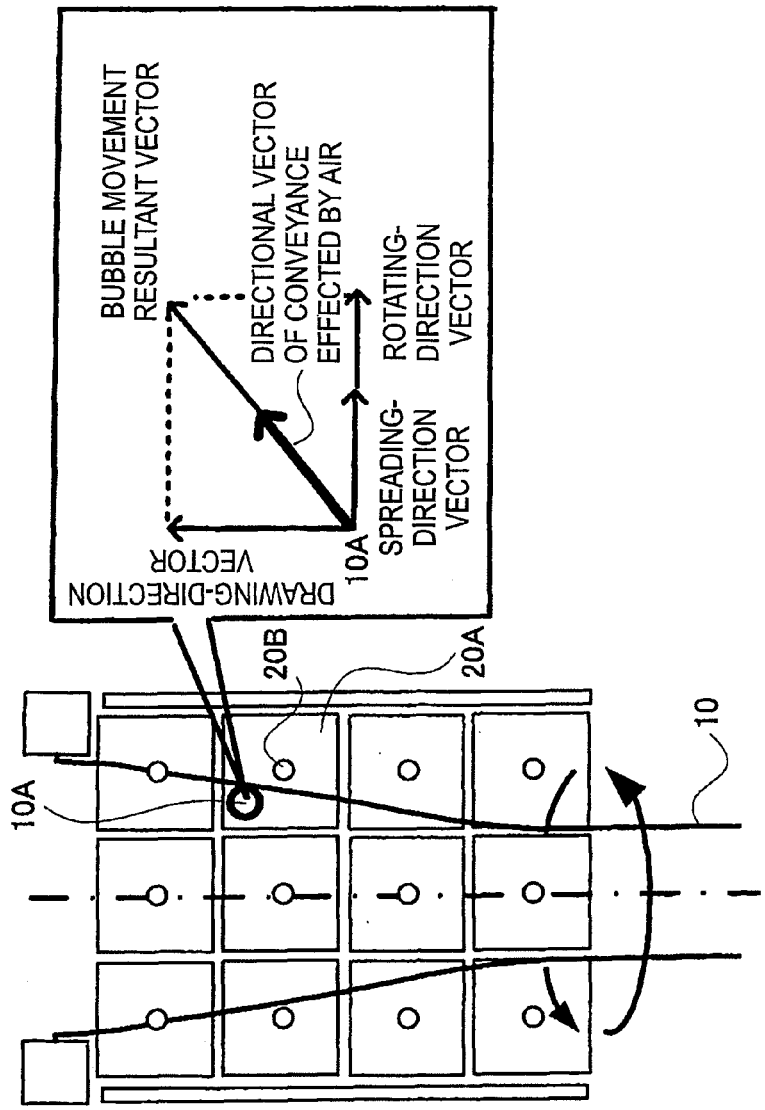
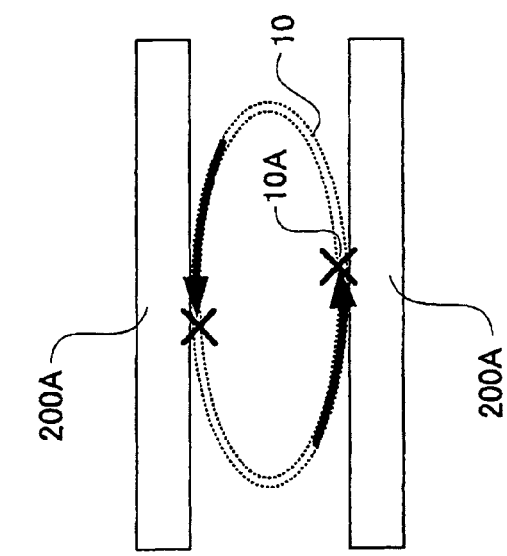
FIG. 6A
FIG. 6B

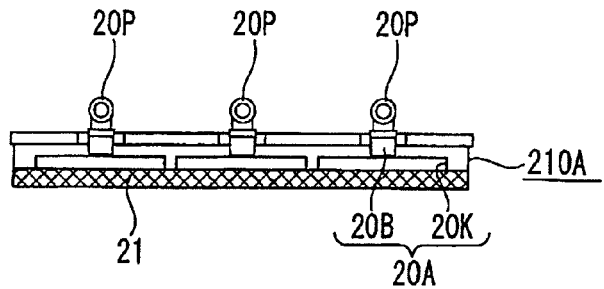
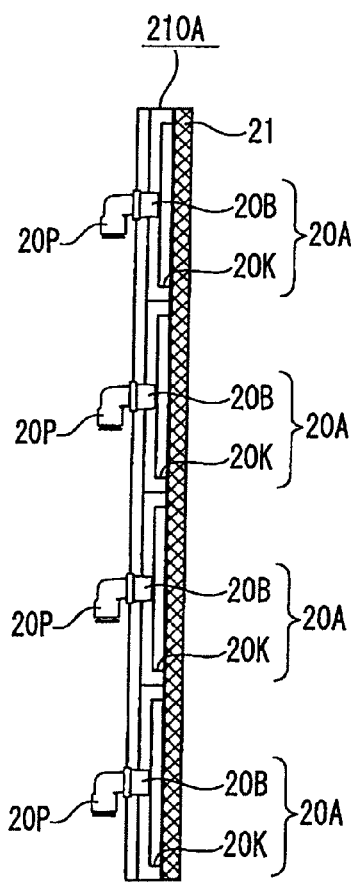
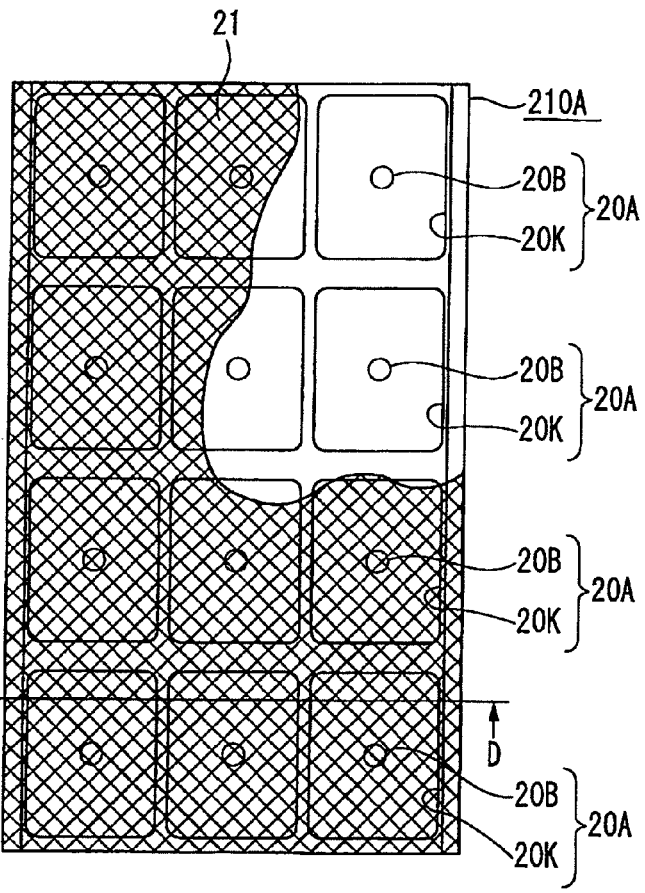
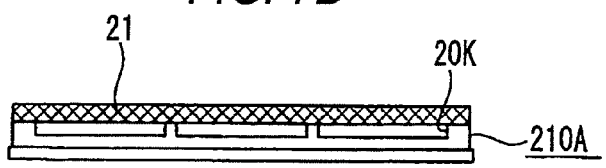

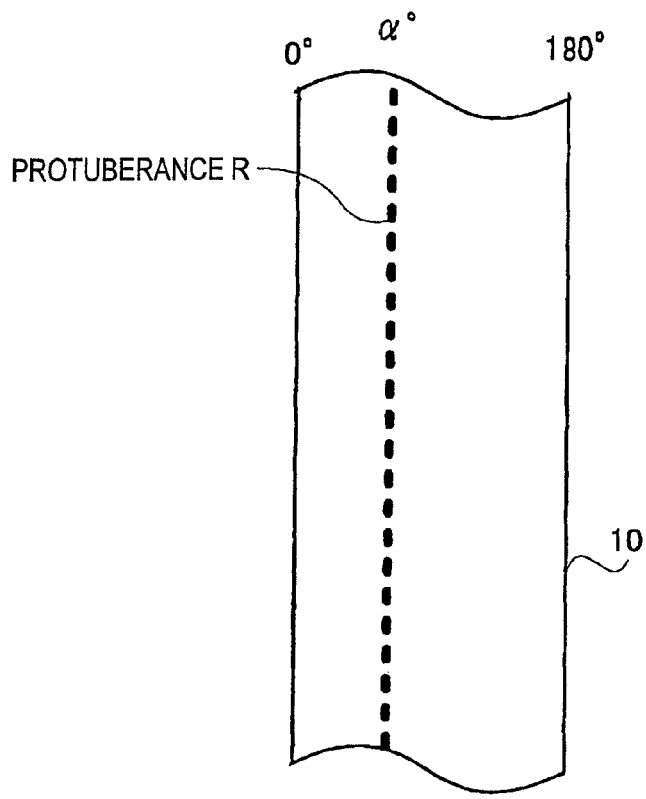 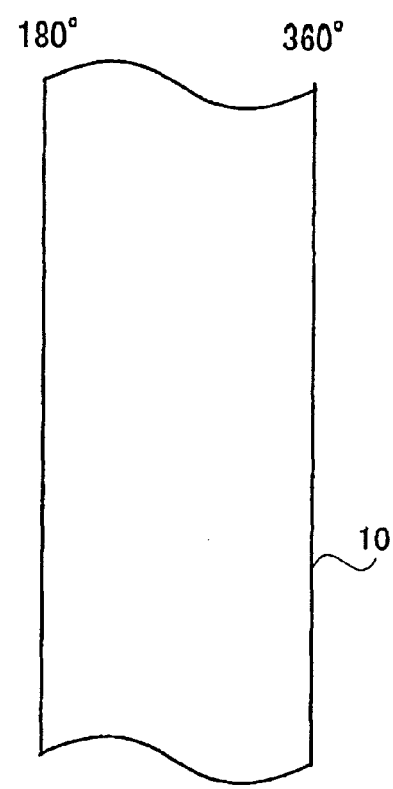
FIG. 8-1A  FIG. 8-1B
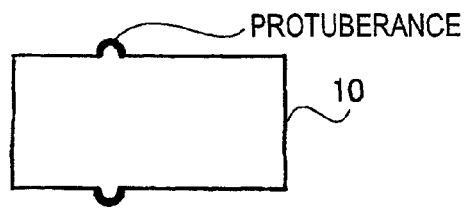
FIG. 8-2

*FIG. 10-1A*  *FIG. 10-1B*
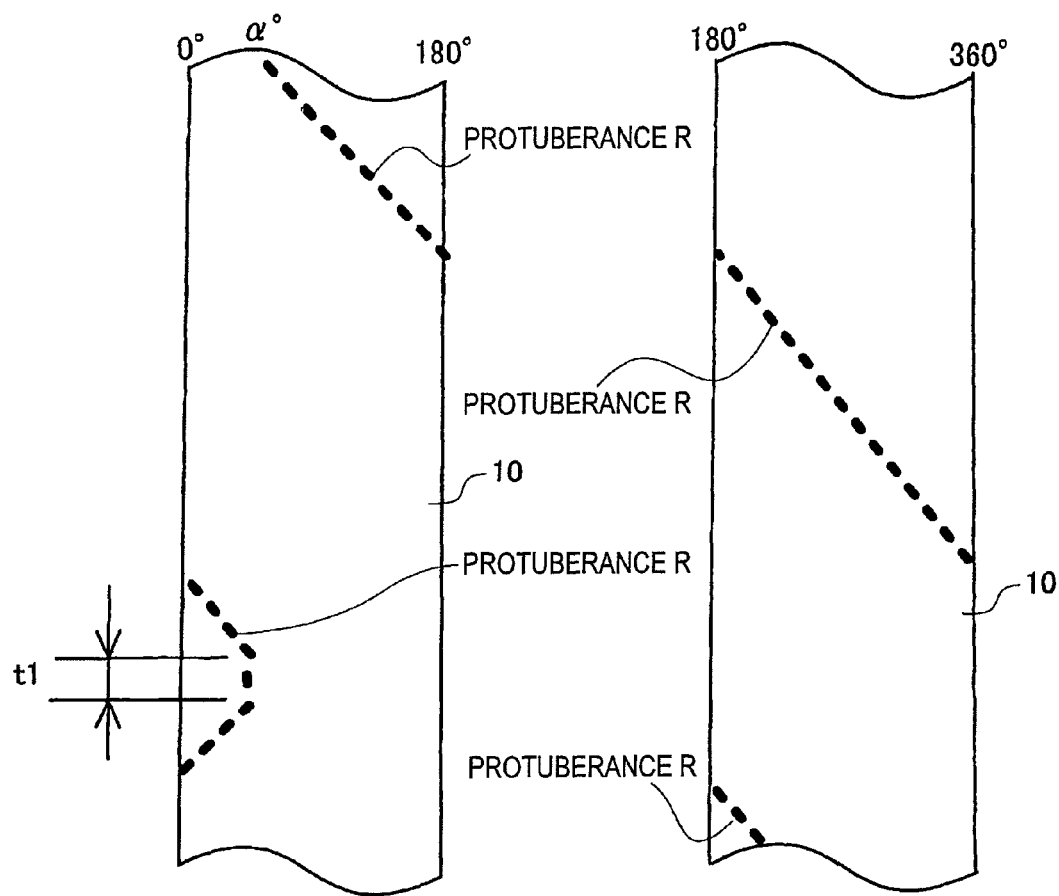
*FIG. 10-2*
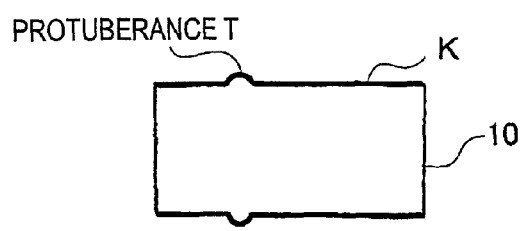

FIG. 11-1A
FIG. 11-1B
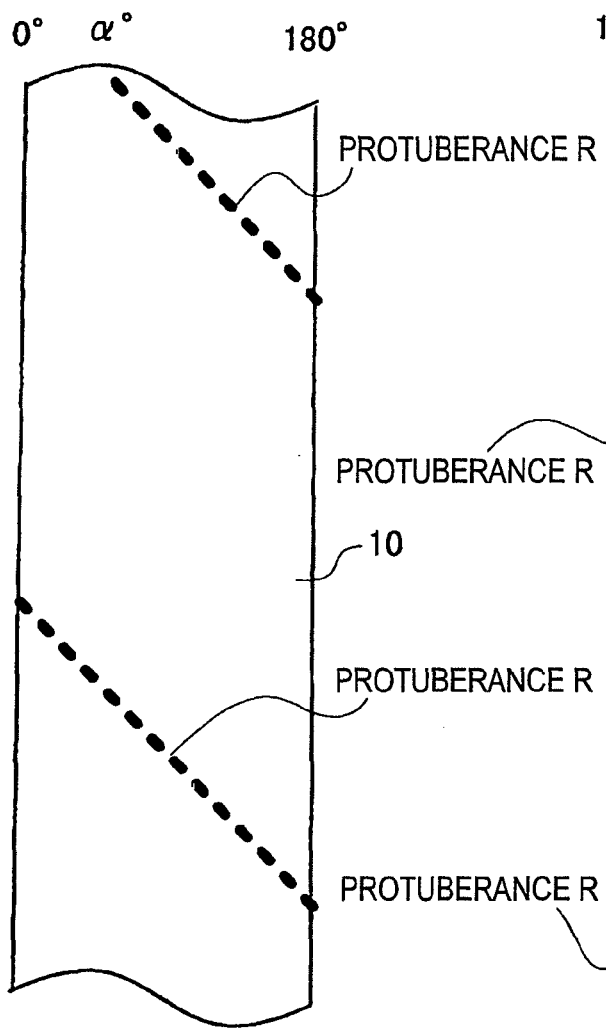
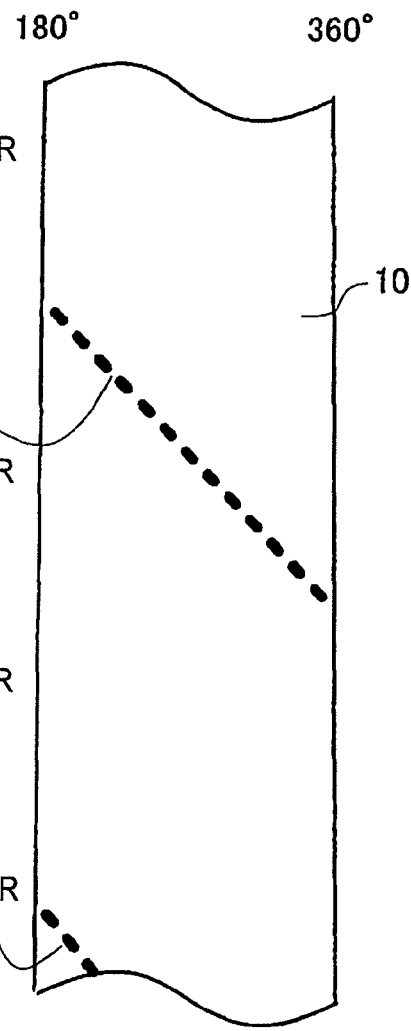
FIG. 11-2A
FIG. 11-2B
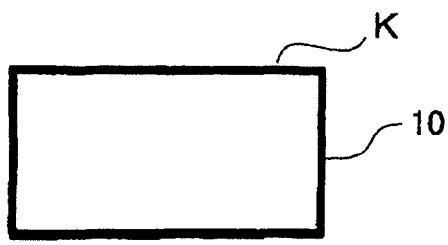
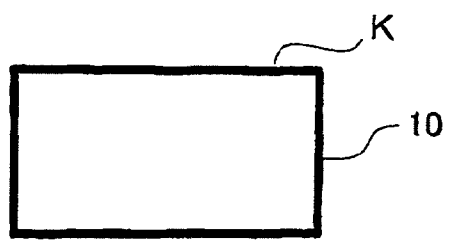

APPARATUS AND METHOD FOR INFLATION EXTRUSION MOLDING OF PRESSURE-SENSITIVE ADHESIVE SHEET

FIELD OF THE INVENTION

The present invention relates to an apparatus and method for inflation extrusion molding of a pressure-sensitive adhesive sheet. The present invention particularly relates to stabilizers that face each other at a predetermined angle, which are used for deforming a resin material (adhesive material) into a flattened elliptical shape after the resin material is extruded from a die by means of inflation and inflated into a cylindrical shape having a predetermined diameter; as well as to the rotation of the stabilizers.

BACKGROUND OF THE INVENTION

As a manufacturing of a sheet in accordance with the inflation extrusion molding technique, there has been a technique using guide rollers. This technique includes transferring a cylindrically inflated sheet extruded from an extruder while flattening the same by means of stabilizers including a plurality of rows of guide rollers. Since the technique enables efficient manufacture of sheets, the technique has hitherto, widely been utilized.

However, unlike manufacture of an ordinary sheet, in case where a pressure-sensitive adhesive sheet having a pressure-sensitive adhesive layer on one side thereof is manufactured by the inflation extrusion molding method, when an attempt is made to convey a cylindrically-shaped pressure-sensitive adhesive sheet in the middle of inflating into a cylindrical shape while flattening the same with a plurality of rows of guide rollers, a mismatch often arises between a traveling direction of the cylindrically-shaped pressure-sensitive adhesive sheet and a rotating-direction of the guide rollers. It is difficult for the cylindrically-shaped pressure-sensitive adhesive sheet to correct the mismatch by sliding over surfaces of the guide rollers. Consequently, a surface of the pressure-sensitive adhesive tape thus obtained sometimes becomes wavy or wrinkled.

Accordingly, another technique has been developed as an advanced version of the above-mentioned technique. This technique makes it possible to prevent winkles, and the like, which would otherwise arise when a resin material, such as a pressure-sensitive adhesive sheet, extruded in accordance with the inflation technique is flatly folded (see JP-A-2005-111980).

According to this technique, each of the stabilizers is built from a plurality of rows of rollers in which a plurality of rollers are arranged in a row, and directions of the respective rollers of the stabilizer are aligned to a substantially same direction where a resin material spreads when deformed into a flattened elliptical shape.

It thereby becomes possible to readily deform a resin material of a pressure-sensitive adhesive sheet extruded in accordance with the inflation method into a flattened elliptical shape and significantly prevent wrinkles, and the like, which would otherwise arise after the pressure-sensitive adhesive sheet is folded.

This technique has made it possible to significantly prevent occurrence of wrinkles, and the like, which would otherwise be caused after the sheet has been folded, as compared with the above-mentioned technique. As mentioned above, even when a slight difference exists between the traveling direction of the sheet and the rotating-direction of the rollers, in case of a pressure-sensitive adhesive sheet exhibiting small pressure-sensitive adhesive force, it slides over the rollers, whereby a slight correction is made to the difference so that the sheet can run in its original traveling direction. Thus, the drawback has been resolved.

When an adherend is flat, there arises no problems with this technique. However, when the adherend has a rough surface, or the like, there arises a necessity for enhancing adhesiveness of the pressure-sensitive adhesive sheet. When a pressure-sensitive adhesive exhibiting enhanced adhesiveness is made on the outermost surface of the sheet, the pressure-sensitive adhesive makes the sheet difficult to slide over the rollers, so that the direction of the sheet cannot be corrected. Therefore, the sheet becomes more difficult to run in the original sheet traveling direction, and occurrence of wrinkles is found here and there in the resultant sheet.

SUMMARY OF THE INVENTION

The present invention has been conceived to solve the drawbacks of the sheet using a pressure-sensitive adhesive having such high adhesiveness and aims at providing an inflation extrusion molding apparatus and method that make it possible to easily deform even a cylindrically-shaped pressure-sensitive adhesive sheet, which has been extruded in accordance with an inflation method and which uses a pressure-sensitive adhesive having such high adhesiveness, into a flattened elliptical shape and that also make it possible to significantly prevent occurrence of wrinkles, and the like, after folding of the sheet.

In order to accomplish the above-mentioned object, the present invention provides an apparatus for inflation extrusion molding of pressure-sensitive adhesive sheet, the apparatus comprising:

one or a plurality of extruders;

a die into which one or a plurality of resin materials including at least a resin material for forming a pressure-sensitive adhesive layer and extruded respectively from the extruders are respectively introduced and which extrudes from an ejection opening the resin materials into an inflated cylindrical shape having a predetermined diameter in accordance with an inflation method; and two stabilizers facing each other at a predetermined angle so as to upwardly approach each other, and defining a space therebetween through which the cylindrically-shaped resin materials extruded from the die are passed to be deformed into a pressure-sensitive adhesive sheet in a flattened elliptical shape having a predetermined width, wherein the stabilizers each have a plurality of air floating portions each of which blows air toward the resin materials; and wherein the stabilizers rotate in one direction around the central axis of the cylindrically-shaped resin materials.

In an embodiment, the air floating portions each have an indentation formed at a surface of the stabilizer and an air outlet provided in proximity to a center of the indentation.

In another embodiment, the stabilizers each comprise a porous member covering the surface thereof at which the air floating portions are provided.

Furthermore, the present invention provides a method for inflation extrusion molding of pressure-sensitive adhesive sheet, the method comprising:

extruding one or a plurality of resin materials including at least a resin material for forming a pressure-sensitive adhesive layer respectively from one or a plurality of extruders to respectively introduce the resin materials into a die, extruding the resin materials from the die into an inflated cylindrical shape having a predetermined diameter in accordance with an inflation method, and passing the cylindrically-shaped resin materials through a space between two stabilizers facing each other at a predetermined angle so as to upwardly approach each other, thereby preparing a pressure-sensitive adhesive sheet in a flattened elliptical shape having a predetermined width, wherein air is blown from the stabilizers toward the resin materials when the resin materials are passed through the space between the stabilizers, and wherein the stabilizers are rotated in one direction around the center axis of the cylindrically-shaped resin materials while the resin materials are passed through the space between the stabilizers.

In an embodiment, the pressure-sensitive adhesive sheet having passed through the space between the stabilizers is separated with a cutter into two pieces.

Moreover, the present invention provides a pressure-sensitive adhesive sheet obtained through the above-mentioned method.

The configurations of the present invention yield the following advantages.

(1) Respective areas of the inflated cylindrical body including one or a plurality of resin material layers (resin material(s) in a form of inflated cylindrical shape) slightly differ from each other in terms of directions of passage thereof. However, the present invention uses the stabilizers that blow (spray) air toward the resin material(s), whereby the resin material(s) is/are floated by air so as not to be in contact with the stabilizers. Accordingly, the respective areas of the resin material(s) can move in their directions of passage, so that it becomes easy to fold the sheet into a flattened elliptical shape without involvement of occurrence of wrinkles, and the like, at the surface of the obtained sheet.

(2) Moreover, since the resin material(s) is/are floated by air so as not to be in contact with the stabilizers, the pressure-sensitive adhesive layer does not adhere to the surfaces of the stabilizers. Hitherto-performed periodic maintenance, such as cleaning of the surfaces of the stabilizers, becomes obviated.

(3) Rollers of conventional stabilizers encounter a problem of extraneous matters (floating dust, or the like) attached to the rollers of the stabilizers adhering to an adhesive surface of a product, to thus deteriorate product quality. On the contrary, in the present invention, the resin material(s) is/are floated by air so as not to be in contact with the stabilizers. Therefore, the extraneous matters attached to the stabilizers do not adhere to the adhesive surface of the product. Hence, deterioration of product quality can be prevented.

(4) Because of nonuniform rotation of the rollers of conventional stabilizers, the rollers raise a problem of scratches arising in the surface of the product, thereby deteriorating product quality. However, in the present invention, the resin material(s) is/are floated by air so as not to be in contact with the stabilizers, and scratches, which would otherwise be caused by nonuniform rotation, can never arise, so that deterioration of product quality can be prevented.

(5) Moreover, for reasons of flow deviations (attributable to the shape of the die, a temperature distribution of the die, and the like) of resin material(s) coming out of the die, a change arises in the thickness of the pressure-sensitive adhesive sheet, so that the sheet comes to exhibit a thickness distribution. In relation to a conventional roll manufactured by winding, as is, the sheet exhibiting the thickness distribution, a specific area on the roll in its widthwise direction is stored, for a long period of time, while remaining irregular and bulged from the other area. As a result, the sheet itself retains irregularity. When the sheet is withdrawn from the roll on occasion of use, the irregularity appears in the sheet. Therefore, when the sheet is affixed to an adherend, the irregular portion of the sheet is left as a wrinkle. On the contrary, in the present invention, the stabilizers are rotated; hence, even when the sheet is rolled up, the thickness distribution can be let spread in the widthwise direction of the roll. Therefore, when the sheet is rolled up, the diameter of the roll can be made uniform, and the irregularity is not retained in a specific area. Consequently, even when the sheet is withdrawn from the roll on occasion of use, the irregularity is not left in the sheet. Therefore, no wrinkles appear when the sheet is affixed to an adherend.

(6) Furthermore, in an embodiment in which the stabilizers each include a porous member covering the surface thereof at which the air floating portions are provided, since the intensity of air blown out of the air floating portions is once suppressed by the porous member, the air blows out more uniformly, so that uniform air layer can be formed on the surface of the resin material(s).

Further, in an embodiment, the pressure-sensitive adhesive sheet having a predetermined width having passed through a space between the two stabilizers is separated into two pieces with a cutter. Accordingly, a sheet can be doubly produced by single inflation operation.

Moreover, in the present invention, since the resin material(s) is/are floated so as not to be in contact with the stabilizers, the pressure-sensitive adhesive sheet do not adhere to the stabilizers, so that wrinkles do not arise.

BRIEF DESCRIPTION OF THE DRAWINGS

FIGS. 3A to 3D are four drawings for describing stabilizers according to embodiment 1 shown in FIG. 1, wherein FIG. 3A is a front view, FIG. 3B is a side view, FIG. 3C is a top view, and FIG. 3D is a cross sectional view that is taken along line D-D shown in FIG. 3A while viewed in arrowy directions.

FIGS. 4A and 4B are conceptual renderings for describing a direction of conveyance of a sheet floated by air blown from the stabilizers, wherein FIG. 4A is a front view of a cylindrically-shaped sheet located in the vicinity of the stabilizer and FIG. 4B is a partially enlarged view.

FIGS. 6A and 6B are conceptual renderings for describing the direction of conveyance of the sheet floated by the air blown from the stabilizers when the stabilizes are rotated, wherein FIG. 6A is a lateral cross sectional view of the stabilizer and FIG. 6B is a front view.

FIGS. 7A to 7D are four drawings for describing stabilizers according to embodiment 2 shown in FIG. 1, wherein FIG. 7A is a front view, FIG. 7B is a side view, FIG. 7C is a top view, and FIG. 7D is a cross sectional view that is taken along line D-D shown in FIG. 7A while viewed in arrowy directions.

FIGS. 8-1A, 8-1B and 8-2 are views for describing a sheet which is ejected from a die that causes an area having a different thickness from others and is deformed into a flattened elliptical shape in accordance with a conventional molding apparatus, wherein FIGS. 8-1A and 8-1B are plan views of a sheet deformed into a flattened elliptical shape, in which FIG. 8-1A is a plan view of one side of the sheet and FIG. 8-1B is a plan view of the other side, and FIGS. 8-2 is a front view of a take-up roll achieved when the sheet shown in FIGS. 8-1A and 8-1B is rolled up.

FIGS. 9-1A, 9-1B and 9-2 are views for describing a sheet which is ejected from a die that causes areas having a different thickness than others and is deformed into a flattened elliptical shape when an apparatus described in connection with JP-UM-B-7-30347 reciprocally rotates stabilizers through 270°, wherein FIGS. 9-1A and 9-1B are plan views of a sheet resulting from deformation into the flattened elliptical shape, in which FIG. 9-1A is a plan view of one side of the sheet, while FIG. 9-1B is a plan view of the other side of the same, and FIG. 9-2 is a front view of a roll into which the sheet shown in FIGS. 9-1A and 9-1B is rolled up.

FIGS. 10-1A, 10-1B and 10-2 are views for describing a sheet which is ejected from a die that causes areas having a different thickness than others and is deformed into a flattened elliptical shape when an apparatus described in connection with JP-UM-B-7-30347 reciprocally rotates stabilizers through 360°, wherein FIGS. 10-1A and 10-1B are plan views of a sheet resulting from deformation into the flattened elliptical shape, in which FIG. 10-1A is a plan view of one side of the sheet, while FIG. 10-1B is a plan view of the other side of the same, and FIG. 10-2 is a front view of a roll into which the sheet shown in FIGS. 10-1A and 10-1B is rolled up.

FIG. 11-1A is a plan view of one of sheets produced by an apparatus according to the present invention, in which a sheet extruded from a die which causes areas having a different thickness than others is deformed into a flattened elliptical shape and the sheet in a flattened elliptical shape is then lengthwise cut with a cutter into two sheets, and FIG. 11-1B is a plan view of the other one of the sheets and FIGS. 11-2A and 11-2B are front views of rolls into which the sheets shown in FIGS. 11-1A and 11-1B are rolled up.

DESCRIPTION OF REFERENCE NUMERALS AND SIGNS

Figure 1:
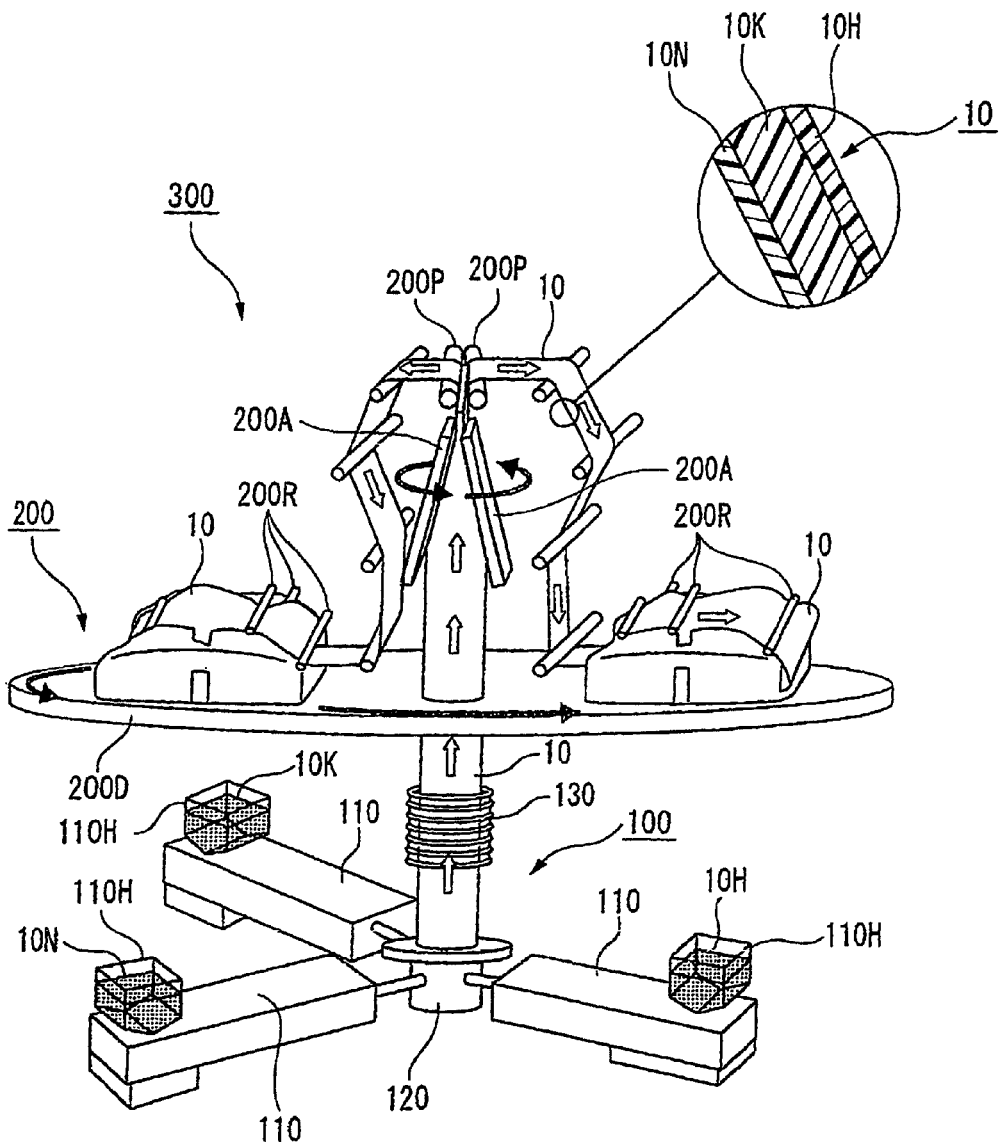
FIG. 1 is a schematic diagram of an entire inflation extrusion molding apparatus of the present invention.

10: resin material (pressure-sensitive adhesive sheet)
10A: sheet area close to stabilizer
10K: resin material for forming substrate layer
10N: resin material for forming pressure-sensitive adhesive layer
10H: resin material for forming back surface layer
20A: air floating portion
20B: air outlet
20K: indentation
20P: air pipe
100: cylindrical resin material generation device
110: extruder
110H: resin material feed port
120: die (dice)
120F: ejection opening
130: guide
200: one-way rotary device
200A: stabilizer according to embodiment 1
210A: stabilizer according to embodiment 2
200D: one-way rotor
200P: pinch roller
200R: guide roller
300: inflation extrusion molding apparatus

DETAILED DESCRIPTION OF THE INVENTION

An exemplary embodiment of an inflation extrusion molding apparatus of the present invention is now described by reference to the drawings.

Herein, according to the present invention, the term "sheet" refers to not only a thin article having a predetermined thickness (e.g. 200 μm) or more, but also a thin article whose thickness is less than the predetermined thickness, which is so called "film".

FIG. 1 is a schematic diagram of an entire inflation extrusion molding apparatus of an embodiment of the present invention, and a description is provided by reference to an exemplary embodiment of manufacture of a three-layered pressure-sensitive adhesive sheet.

<Extruder 110>

In FIG. 1, a resin material 10K for forming substrate layer extruded by an extruder 110 from a resin material feed port 110H containing the resin material 10K in a melt state is introduced into a die (dice) 120. Likewise, a resin material 10N for forming pressure-sensitive adhesive layer extruded by the extruder 110 from the resin material feed port 110H containing the resin material 10N is introduced into the die 120. Similarly, a resin material 10H for forming back surface layer extruded by the extruder 110 from the resin material feed port 110H containing the resin material 10H is introduced into the die 120.

<Die 120>

Figure 2:
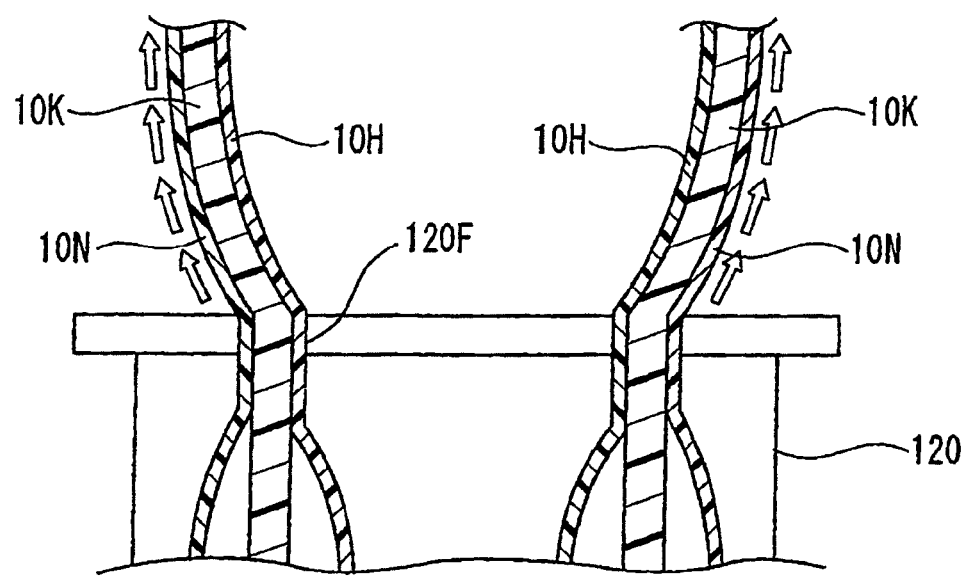
FIG. 2 is a longitudinal cross-sectional view of a die shown in FIG. 1.
Figure 3C:
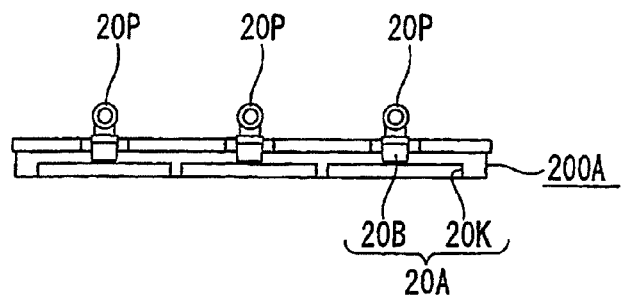
Figure 3B:
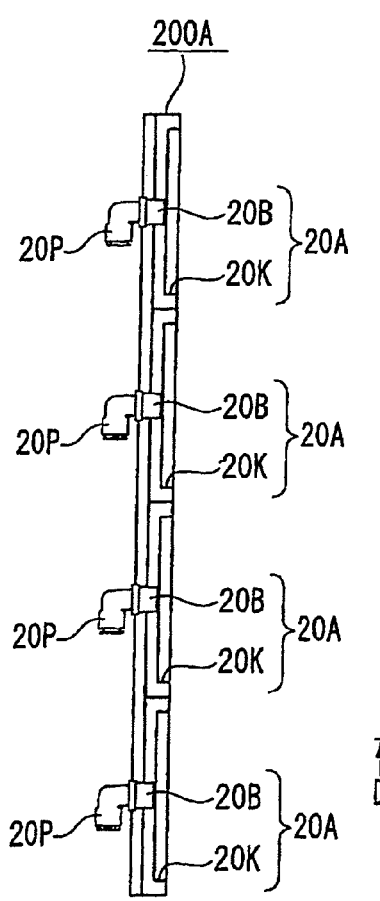
Figure 3A:
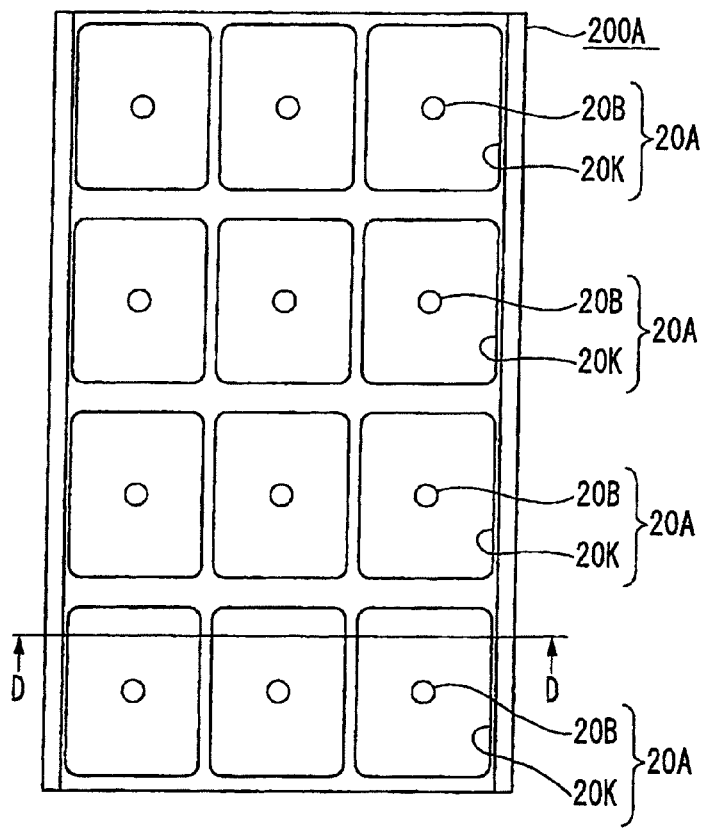
Figure 3D:
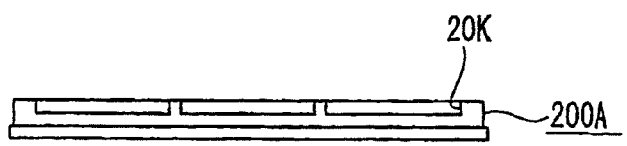

FIG. 2 is a cross-sectional view showing flow channels of respective resin materials in the die 120. Resin materials (resin material 10H for forming back surface layer, resin material 10K for forming substrate layer, and resin material 10N for forming pressure-sensitive adhesive layer) passed through the flow channels in communication with an ejection opening 120F are concentrically and cylindrically extruded upwardly from the annular and concentrically-made ejection opening. An air inlet pipe (omitted from the drawings) is made in the die 120. Air is blown to the inside of the cylindrically-shaped resin materials 10H, 10K, and 10N by way of the air inlet pipe, thereby inflating the resin materials 10H, 10K, and 10N from thick cylindrical shape having a predetermined diameter to thin cylindrical shape having a large diameter. In FIG. 2, the materials exit the annular upper ejection opening such that the resin material 10N for forming pressure-sensitive adhesive layer comes into an external layer; that the resin material 10K for forming substrate layer comes into an internal layer; and that the resin material 10H for forming back surface layer comes into a back surface layer. The layers approach each other as they ascend in the die 120, to thus be extruded from the ejection opening 120F of the die 120. Since air is blown to the inside of the thus-extruded sheet 10, the layers are extruded in the form of a thin cylindrical body inflated to a predetermined diameter in a mutually closely-bonded state.

<Cylindrically-Shaped Resin Materials 10 (Cylindrical Body Including Resin Material Layers)>

In the case of the embodiment for making cylindrically-shaped resin materials (cylindrical body) 10, the respective resin materials are introduced into corresponding flow channels in such a way that the resin material 10N for forming pressure-sensitive adhesive layer comes into the external layer; that the resin material 10K for forming substrate layer that is to serve as a substrate comes into the internal layer; and that the resin material 10H for forming back surface layer comes into the back layer. The respective resins approach each other as they ascend in the die 120. When extruded out of the ejection opening of the die 120, the three layers of resin materials come into a large-diameter cylindrically inflated sheet such that the layers of resin materials remain in a close contact with each other, in sequence from inside to outside, the resin material 10H for forming back surface layer, the resin material 10K for forming substrate layer, and the resin material 10N for forming pressure-sensitive adhesive layer. In this embodiment, a pressure-sensitive adhesive having especially high adhesiveness is used. The materials will be described in detail later.

<Guide 130>

The cylindrically-extruded resin materials 10 (10H, 10K, and 10N) is positionally guided by a guide 130 so as not to move on all sides, whereupon the cylindrically inflated resin materials upwardly run without involvement of occurrence of movements.

<Stabilizer 200A>

The cylindrically inflated resin materials 10 are introduced into a space between stabilizers 200A and 200A that face each other at a predetermined angle. After squeezed into a flattened elliptical shape, the resin materials 10 are guided into a space between a pair of pinch rollers 200P and 200P while being folded.

<Angle of Aperture Between the Stabilizers>

The two stabilizers 200A and 200A are arranged so as to face each other at a predetermined angle (an angle of aperture) θ (see FIG. 4A) so as to nip the flow channel of the resin materials 10 with respect to the traveling direction of the resin materials 10 so that the cylindrically inflated resin materials 10 extruded from the die 120 can be deformed into a flattened elliptical shape.

The angle of aperture θ between the stabilizers 200A and 200A must take into account a gradient of deformation of the cylindrically inflated resin materials 10 achieved between the stabilizers 200A and 200A, and the like. It is desirable to select the angle of aperture, as appropriate, according to the viscosity of the resin materials 10. The angle of aperture is preferably set so as to fall within a range from 10° to 45°, preferably from 10° to 30°, and more preferably from 10° to 25°.

<Embodiment 1 of the Stabilizer 200a Having Air Floating Portions>

As shown in FIGS. 3A to 3D, each of the stabilizers 200A and 200A is a rectangular plate and has, on a surface thereof, a plurality of air floating portions 20A, whereby the sheet can pass through a space between the stabilizers 200A and 200A without contacting the stabilizers 200A and 200A.

<Configuration of the Air Floating Portions 20A>

Each of the air floating portions 20A has a rectangular indentation 20K and an air outlet 20B provided in the vicinity of the center of the indentation 20K, both of which are provided on a surface of each of the stabilizers 200A. The air outlets 20B are connected to an air pipe 20P. Air to be blown (sprayed) from the air outlets 20B is fed from an air supply source (omitted from the drawings) on the stationary side to the air pipe 20P on the rotary device side by way of a rotary joint (omitted from the drawings), to thus reach the air outlets 20B by way of the air pipe 20P. Since the rectangular indentations 20K are formed in a surface of each of the stabilizers 200A, the air blown from the air outlets 20B spreads over interiors of the respective indentations 20K. The air thus spread over the interiors of the respective indentations 20K act as contact pressure, to thus float (levitate) the sheet (resin materials). Hence, as will be described below, the entire sheet can be floated even when the air outlets 20B are not so great in numbers.

<Layout of the Air Floating Portions 20A>

The plurality of air floating portions 20A are provided on each of the stabilizers 200A in both its lateral and longitudinal directions. In FIGS. 3A to 3D, three air floating portions are provided in the lateral direction, and four are provided in the longitudinal direction. Thus, a total of 12 air floating portions are provided in close contact with each other without involvement of clearance. Air from the interiors of the indentations 20K acts as contact pressure, to thus float the sheet. Accordingly, even when the number of the air outlets 20B is small, they can float the sheet from the stabilizers 200A in a non-contacting manner. Therefore, the pressure-sensitive adhesive layer does not contact the stabilizers 200A, and no wrinkles, and the like, arise on the surface of the sheet. Thus, folding the sheet into a flattened elliptical shape becomes facilitated.

<Function of the Stabilizers>

FIGS. 4A and 4B are conceptual renderings for describing a direction of conveyance of a sheet passing between the stabilizers, wherein FIG. 4A is a front view of a cylindrically-shaped sheet located in the vicinity of the stabilizer and FIG. 4B is a partially enlarged view for describing the direction of conveyance of the sheet by the air floating portions 20A.

In FIG. 4A, the two stabilizers 200A are arranged, while oriented upwardly, so as to approach each other at the angle of aperture θ. When taken up by pinch rollers 200P positioned above the respective two stabilizers 200A, the cylindrically inflated resin materials 10 gradually become deformed from the cylindrical shape into a flattened elliptical shape while passing through the space between the two stabilizers 200A.

As shown in FIG. 4B, immediately-above-oriented drawing force acts on a certain area 10A of the sheet, and force for causing deformation of a cylindrical shape into a flattened elliptical shape also acts on the certain area 10A in a horizontal direction at a point between the stabilizers 200A. Consequently, the area 10A comes to move in a direction of a bubble movement resultant vector that is a combination of a drawing-direction (immediately-above-oriented) vector and a spreading-direction (the horizontal direction) vector. As mentioned previously, since the air floating portions 20A float the sheet by means of the air originated from the entire surfaces of the air floating portions, the sheet can readily be floated in a non-contacting manner from the stabilizers 200A even when the number of the air outlets 20B is small. Therefore, respective areas of the sheet can readily move in the direction of the bubble movement resultant vector. Since the vector of the traveling direction of the sheet coincides with the direction of the bubble movement resultant vector, the sheet areas 10A do not undergo torsion. Moreover, since the sheet is floated in a non-contacting manner, the sheet does not contact the air flowing portions 20A. Therefore, the sheet is liable to neither scratches nor generation of wrinkles.

Furthermore, since the sheet is floated by air in a non-contacting manner, the pressure-sensitive adhesive layer does not come to adhere to the surfaces of the stabilizers, so that hitherto practiced periodic maintenance, such as cleaning of the surfaces of the stabilizers, becomes obviated.

<Processing 1 for the Sheet Passed Through the Pinch Rollers 200P>

Turning back to FIG. 1, a cutter (omitted from the drawings) is placed at a location where both ends of the resin materials 10 folded into a flat shape after having passed between the pinch rollers 200P and 200P are to lie. The flatly folded resin materials 10 are cut into two right and left pieces with the cutter as shown in FIG. 1. The thus-cut pieces are wound by take-up rollers (omitted from the drawings) situated at respective ends by way of respective right and left guide rollers 200R and 200R.

As mentioned above, in this embodiment, both ends of the thus-folded resin materials are cut by means of the cutters, whereby a sheet can be doubly manufactured by single inflation as compared with the conventional technique. Thus, productivity is considerably enhanced.

<Rotating the Stabilizers in One Direction>

Figure 5:
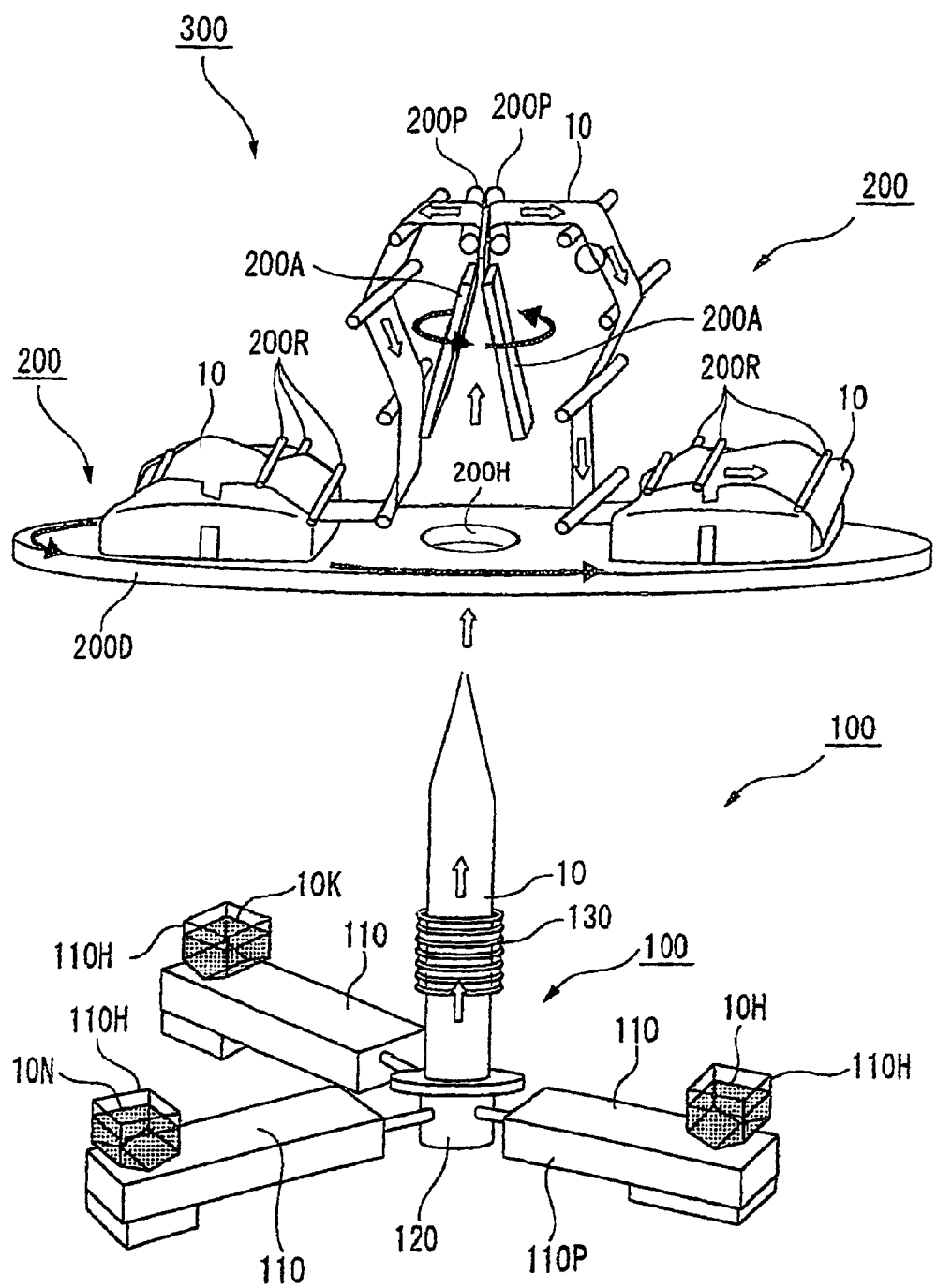
FIG. 5 is a schematic diagram showing that a one-way rotary device is upwardly separated from the inflation extrusion molding apparatus shown in FIG. 1.

The inflation extrusion molding apparatus shown in FIG. 1 includes a stationary unit and a rotary unit. FIG. 5 is a schematic diagram showing that a rotary device is separated upwardly with a view toward making the stationary unit and the rotary unit of the inflation extrusion molding apparatus shown in FIG. 1 easy to understand.

In FIG. 5, reference numeral 100 designates a cylindrical resin material production device (the stationary unit), and 200 designates a one-way rotary device (the rotary unit). The one-way rotary device 200 includes the two stabilizers 200A and 200A fastened on a one-way rotator 200D. When the one-way rotator 200D is slowly rotated in one direction by means of a motor (omitted from the drawings), the two stabilizers 200A and 200A and take-up units (the guide rollers 200R) slowly rotate in one direction, either.

<An Advantage of One-Way Rotation>

The resin materials 10 ascent from the cylindrical resin material production device 100 enters a space between the stabilizers 200A and 200A from an opening 200H formed in the center of the one-way rotator 200D, thereby undergoing flattening. Simultaneously, the one-way rotor 200D rotates around the resin materials 10, so that the stabilizers 200A and 200A also rotate. Consequently, both folded ends of the resin materials 10 are formed at a location close to the viewer and another location distal from the viewer on a drawing sheet of FIG. 1. When the one-way rotor 200D rotates in a direction of an arrow through 90°, both ends of the resin material 10 are formed at right and left sides on the drawing sheet. When the one-way rotor 200D rotates in the direction of the arrow through 90° in this state, respective ends of the resin material 10 are formed at the location close to the viewer and the location distal from the viewer. When the one-way rotor 200D further rotates in the direction of the arrow through 90°, both ends of the resin material 10 are formed at right and left sides on the drawing sheet. When the one-way rotor 200D additionally rotates in this state in the direction of the arrow through 90°, the resin material returns to the state shown in FIG. 1. Thus, both folded ends move over the entire perimeter of the cylindrically-shaped resin materials. Consequently, the thickness of the cylindrically-shaped resin materials becomes uniform over the entire perimeter, and a protuberance does not arise when the sheet is taken up.

FIGS. 6A and 6B are conceptual renderings for describing the direction of conveyance of the sheet floated by the air blown from the stabilizers when the stabilizes are rotated, wherein FIG. 6A is a lateral cross sectional view of the stabilizer and FIG. 6B is a front view. As shown in FIG. 6A, when the stabilizers 200A rotate in a direction of an arrow, a sheet area 10A close to the stabilizers also comes to undergo the force in the rotating-direction (the horizontal direction).

Consequently, the bubble movement resultant vector exerted on the sheet area 10A is equal to a result of "rotating-direction vector" being further added to the resultant vector shown in FIG. 4B. Therefore, the bubble movement resultant vector greatly differs from the drawing-direction vector.

However, the traveling direction of the sheet is free by virtue of floating effected by the air floating portions 20A adopted by the present invention. Consequently, if the direction of the bubble movement resultant vector has greatly changed from the drawing-direction vector, the sheet will move in the direction of the bubble movement resultant vector. Therefore, even when the stabilizers 200A are rotated, a problem of occurrence of wrinkles, and the like, does not arise.

<Embodiment 2 of the Stabilizer 200A Having Air Floating Portions>

In this embodiment, as shown in FIGS. 7A to 7D, each of the stabilizers 200A and 200A is a rectangular plate and has, on a surface thereof, a plurality of air floating portions 20A. Each of the air floating portions 20A has a rectangular indentation 20K and an air outlet 20B provided in the vicinity of the center of the indentation 20K, both of which are provided on a surface of each of the stabilizers 200A. The air outlets 20B are connected to an air pipe 20P. In this embodiment, a porous member 21 covers the surface of each stabilizer 210A at which the air floating portions are provided Owing to this constitution, the intensity of air blown out of air outlets 20B of the air floating portions 20A is once suppressed by the porous member 21, and then the air blows out through porous paths inside the porous member 21. Therefore, the air blows out more uniformly in comparison with embodiment 1, so that uniform air layer can be formed on the surface of the resin materials (sheet).

Although the material of the porous member 21 is not limited, metal materials such as stainless steel, titanium, copper, nickel, aluminum and alloys thereof; sintered body (ceramics) such as alumina ($Al_2O_3$) and silicone carbide (SiC); glass fibers; and polymer materials such as polyethylene (PE), polypropylene (PP), ethylene/vinyl acetate copolymer (EVA), polyacetylene (PA), poly(methyl methacylate) (PMMA), acrylonitrile/styrene copolymer (AS), acrylonitrile/butadiene/styrene copolymer (ABS), polycarbonate (PC), polyvinyl chloride (PVC), poly(vinylidene fluoride) (PVDF) and polytetrafluoroethylene (PTFE).

The pore size of the porous member 21 is preferably 0.1 to 1,000 μm, more preferably 1 to 500 μm, and furthermore preferably 10 to 50 μm.

The porosity of the porous member 21 is preferably 10 to 80%, more preferably 10 to 50%.

The thickness of the porous member 21 is preferably 5 to 30 mm, more preferably 5 to 20 mm, and furthermore preferably 8 to 15 mm.

Figures 1A, 9:
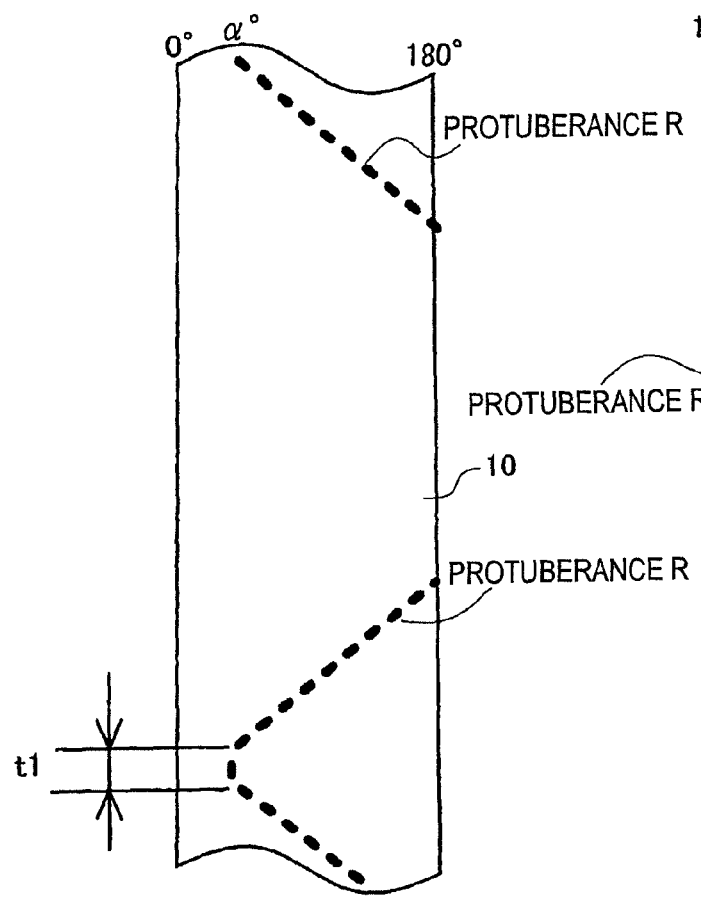
Figures 1B, 9:
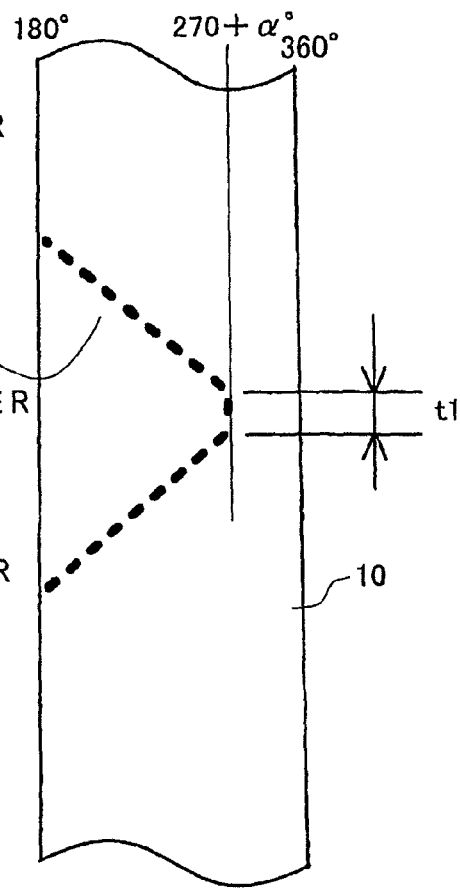
Figures 2, 9:
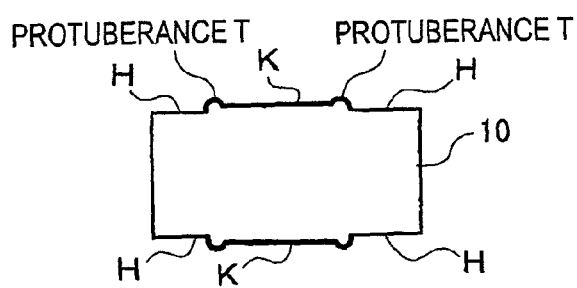

FIGS. 8-1A, 8-1B and 8-2 are views for describing a sheet which is ejected from a die that causes an area having a different thickness from others (the area is herein tentatively taken as "protuberance R") and is deformed into a flattened elliptical shape in accordance with a conventional molding apparatus. FIGS. 8-1A and 8-1B are plan views of a sheet deformed into a flattened elliptical shape, wherein FIG. 8-1A is a plan view of one side of the sheet and FIG. 8-1B is a plan view of the other side. FIGS. 8-2 is a front view of a take-up roll achieved when the sheet shown in FIGS. 8-1A and 8-1B is rolled up.

When a change exists in the viscosity of the cylindrically-shaped sheet in its circumferential direction due to temperature distribution at the ejection opening of the die or when the pressure-sensitive adhesive is ejected in a disproportionate quantity, a change arises in the thickness of the sheet, whereupon an area which has a different thickness than others occasionally arises (the area is taken as protuberance R in FIGS. 8-1A and 8-2). In this case, when the stabilizers 200A are left fastened as conventionally, the area having a different thickness than others is formed along a lengthwise direction of the sheet and in parallel with an edge of the same, only at a point corresponding to an angle α° in the widthwise direction of the sheet as shown in FIG. 7-1A. Therefore, when such a sheet is rolled up as shown in FIG. 8-2, a protuberance bulging in a circumferential direction arises in a location on the surface of the cylindrical roller corresponding to the angle α°.

When the sheet is stored in a rolled state along with such a protuberance, an unevenness caused by the protuberance is retained in the sheet itself. Therefore, when the sheet is withdrawn from the roll during use and affixed to an adherend, the unevenness left in the sheet itself is also left, as it is, in the form of a wrinkle on the adherend.

Meanwhile, since the apparatus described in connection with JP-UM-B-7-30347 reciprocally rotates the stabilizers through 180° to 360°, the protuberance R having a different thickness spreads in its lateral direction, to thus become uniform. For this reason, the protuberance that is shown in FIG. 8-2 and generated by the conventional apparatus is prevented. However, the apparatus described in connection with JP-UM-B-7-30347 also encounters occurrence of a radial difference. FIGS. 9-1A, 9-1B and 9-2 are views for describing a sheet which is ejected from the die that causes areas having a different thickness than others and is deformed into a flattened elliptical shape when an apparatus described in connection with JP-UM-B-7-30347 reciprocally rotates stabilizers through 270°, wherein FIGS. 9-1A and 9-1B are plan views of a sheet resulting from deformation into the flattened elliptical shape, in which FIG. 9-1A is a plan view of one side of the sheet, while FIG. 9-1B is a plan view of the other side of the same, and FIG. 9-2 is a front view of a roll into which the sheet shown in FIGS. 9-1A and 9-1B is rolled up.

In FIGS. 9-1A, 9-1B and 9-2, the stabilizers are rotated through 270°. Therefore, during the course of rotation of the stabilizers, the protuberances R, which are the only areas having a different thickness in the widthwise direction such as those shown in FIGS. 9-1A and 9-1B, obliquely proceed with respect to the edge of the sheet as the sheet runs in its lengthwise direction. Consequently, the protuberances R spread in their widthwise direction in this zone. Hence, when the sheet is rolled up, the roll is made uniform as indicated by reference symbol K shown in FIG. 9-2 in the zone from $\alpha°$ to $270°+\alpha$, so that the protuberance (shown in FIG. 8-2) disappears.

Incidentally, when the point corresponding to $270°+\alpha$ is achieved, the stabilizers make a U-turn. Therefore, when the sheet is rolled up, the protuberances R do not spread in their widthwise direction in a zone from $270°+\alpha$ to $0°+\alpha$. Therefore, an area that is smaller than the uniform area K in terms of the diameter of the roll arises as in the area H shown in FIG. 9-2. Consequently, a radial difference (K−H) arises at two locations in a boundary between the area H and the area K.

Moreover, in the case of reciprocal rotation, rotation of the stabilizers is stopped at the time of a U-turn, whilst inflation is not stopped. Therefore, the protuberances R at each of turning points $\alpha°$ and $270°+\alpha°$ stay for a period of t1 that is longer than a period during which the protuberance R stays in the other area. Thus, there are formed protuberances in which only portions corresponding to the turning points are greater in their lengthwise direction. The protuberances are always formed at the same points in their widthwise direction. Accordingly, when the sheet is rolled up, the protuberances T generated as a result of the stabilizers continuously staying for the period t1 finally appear in two points (steps) as shown in FIG. 9-2.

When the sheet including the radial difference and the protuberances T is stored in a rolled state, an unevenness caused by the radial difference and the protuberances is retained in the sheet itself. Therefore, when the sheet is withdrawn from the roll during use and affixed to an adherend, the unevenness left in the sheet itself is also left, as it is, in the form of a wrinkle on the adherend.

FIGS. 10-1A, 10-1B and 10-2 are views for describing a sheet which is ejected from the die that causes areas having a different thickness than others and is deformed into a flattened elliptical shape when an apparatus described in connection with JP-UM-B-7-30347 reciprocally rotates stabilizers through 360°, wherein FIGS. 10-1A and 10-1B are plan views of a sheet resulting from deformation into the flattened elliptical shape, in which FIG. 10-1A is a plan view of one side of the sheet, while FIG. 10-1B is a plan view of the other side of the same, and FIG. 10-2 is a front view of a roll into which the sheet shown in FIGS. 10-1A and 10-1B is rolled up.

In FIGS. 10-1A, 10-1B and 10-2, the stabilizers are caused to make a U-turn at an angle of 360°, whereupon the protuberances R spread in their widthwise direction, to thus become uniform as indicated by reference symbol K shown in FIG. 10-2. For this reason, the radial difference (K−H), such as that shown in FIG. 9-2, is resolved.

However, as described in connection with FIG. 9-2, rotation of the stabilizers is stopped at the time of a U-turn, whilst inflation is not stopped. Therefore, when the protuberances R at the turning point a stay for a period t1 that is longer than the period during which the protuberances R stay in the other area. Thus, there are formed protuberances T in which only portions corresponding to the turning point are greater in their lengthwise direction.

When the sheet including the protuberances T is stored in a rolled state, an unevenness caused by the protuberances is retained in the sheet itself. Therefore, when the sheet is withdrawn from the roll during use and affixed to an adherend, the unevenness left in the sheet itself is also left, as it is, in the form of a wrinkle on the adherend.

On the contrary, according to the present invention, the stabilizers 200A are continually rotated in one direction. Accordingly, as shown in FIGS. 11-1A and 11-1B, the protuberances R having a different thickness than others continually proceed (without involvement of a U-turn) in their widthwise direction. Therefore, even when both ends of the sheet in a flattened elliptical shape (flattened elliptical body) are cut with a cutter so as to be separated into two sheets and then the thus-separated two sheets are respectively rolled up, the protuberances R having a different thickness spread in their widthwise direction, to thus become uniform like K as shown in FIGS. 11-2A and 11-2B. For these reasons, the protuberances (shown in FIG. 8-2), the radial difference (K−H shown in FIG. 9-2), and the protuberances T (shown in FIGS. 9-2 and 10-2) do not generate.

Consequently, even when the sheet is withdrawn from the roll during use and affixed to an adherend, no wrinkles arise on the adherend because the sheet itself does not include any unevenness.

<Moldable Resin Material>

As mentioned above, the resin material 10 easily spreads between the stabilizers 200A and 200A, and irregular occurrence of wrinkles is prevented. Therefore, various types of resin materials can be molded. Examples of moldable resin materials include homopolypropylene; block, random or other propylene polymers containing ethylene units as comonomer units; ethylene polymers such as low-density ethylene polymers, high-density ethylene polymers, and linear low-density ethylene polymers; polystyrene; polyesters; olefin polymers that are copolymers of ethylene and other monomer(s) such as ethylene/methyl methacrylate copolymers; styrene/isoprene/styrene block copolymers (SIS); styrene/butadiene/styrene block copolymers (SBS); styrene/isoprene block copolymers (SI); styrene/butadiene block copolymers (SB); styrene/ethylene-propylene/styrene block copolymers (SEPS); styrene/ethylene-butylene/styrene block copolymers (SEBS); styrene/ethylene-butylene-propylene block copolymers (SEP); styrene/ethylene-butylene block copolymers (SEB); styrene/ethylene-butylene/olefin crystal block copolymers (SEBC); olefin crystal/ethylene-butylene/olefin crystal block copolymers (CEBC); styrene/isobutylene/styrene block copolymers (SIBS); styrene/butadiene random copolymers (SBR); hydrogenated styrene/butadiene random copolymers (HSBR); ethylene/vinyl acetate copolymers (EVA); ethylene/propylene rubbers (EPR); and ethylene/propylene/α-olefin rubbers. These resin materials may be used solely or as a mixture of two or more of them.

<Resin Material for Forming Pressure-Sensitive Adhesive Layer>

As mentioned above, molding of various resin materials is possible. For instance, even when a pressure-sensitive adhesive layer is provided on one side of a sheet such as a pressure-sensitive adhesive sheet, a pressure-sensitive adhesive sheet free from occurrence of wrinkles can be produced.

Examples of the resin materials for forming pressure-sensitive adhesive layer include styrene/isoprene/styrene block copolymers (SIS); styrene/butadiene/styrene block copolymers (SBS); styrene/isoprene block copolymers (SI); styrene/butadiene block copolymers (SB); styrene/ethylene-propylene/styrene block copolymers (SEPS); styrene/ethylene-butylene/styrene block copolymers (SEBS); styrene/ethylene-butylene-propylene block copolymers (SEP); styrene/ethylene-butylene block copolymers (SEB); styrene/ethylene-butylene/olefin crystal block copolymers (SEBC); olefin crystal/ethylene-butylene/olefin crystal block copolymers (CEBC); styrene/isobutylene/styrene block copolymers (SIBS); styrene/butadiene random copolymers (SBR); hydrogenated styrene/butadiene random copolymers (HSBR); ethylene/vinyl acetate copolymers (EVA); ethylene/propylene rubbers (EPR); and ethylene/propylene/α-olefin rubbers. The resin materials may be used solely or as a mixture of two or more of them.

In addition, examples of the resin materials for forming pressure-sensitive adhesive layer include SEEPS [styrene/(ethylene-ethylene/propylene)/styrene block copolymers].

Moreover, resin materials that can be used for forming substrate layer, such as thermoplastic urethane and acryl block copolymers which will be described later may be employed as a resin material for forming pressure-sensitive adhesive.

As an acrylic block copolymers for forming pressure-sensitive adhesive, acrylic block copolymers (A) composed of methacrylic copolymer blocks (a) containing ester of methacrylic acid as a principal component and acrylic copolymer blocks (b) containing ester of acrylic acid as a principal component may be mentioned. A structure of the acrylic block copolymers (A) may be either linear block copolymers or branched (star) block copolymers or a mixture thereof. Such a structure of the block copolymers is selected, as appropriate, according to physical properties of the required acrylic block copolymers (A). The linear block copolymers are preferable in view of cost and ease of polymerization.

The linear block copolymers may assume either of the structures. However, provided that the methacrylic copolymer blocks (a) are taken as "a" and that the acrylic copolymer blocks (b) are taken as "b" from the viewpoint of physical properties of the linear block copolymer and physical properties of compositions, it is preferable that the linear block copolymers be composed of at least one type of acrylic block copolymers selected from the group consisting of (a-b)n-type acrylic block copolymers, b-(a-b)n-type acrylic block copolymers, and (a-b)n-a-type acrylic block copolymers ("n" is an integer of more than one; for instance, an integer from one to three). Among these acrylic block copolymers, a-b-type di-block copolymers, a-b-a-type tri-block copolymers, or a mixture thereof are preferable in view of ease of handling during processing or physical properties of compositions.

The resin material for forming pressure-sensitive adhesive layer may also contain other components, as required. Examples of other components include olefin resins; silicone resins, liquid acrylic copolymers; polyethylene imines; fatty amides; phosphate esters; and common additives. Types, number, and quantity of other components to be contained in the resin material for forming pressure-sensitive adhesive layer can be appropriately set according to an objective. Examples of the additives include tackifiers; softeners; anti-oxidants; hindered amine light stabilizers; ultraviolet absorbers; and fillers or pigments, such as calcium oxide, magnesium oxide, silica or zinc oxide, and titanium oxide.

<Tackifiers>

In order to further improve adhesiveness, tackifier (tackifier resin) may be added to the resin material for forming pressure-sensitive adhesive layer. Examples of the tackifiers include petroleum resins of an aliphatic type, an aromatic type, an aliphatic/aromatic copolymer type, or an alicyclic type; coumarone-indene resins; terpene resins; terpene-phenol resins; alkylphenol resins; rosin resins; polymerized rosin resins; xylene resins; and resins obtained by hydrogenating these resins. One or more appropriate materials selected from these tackifiers can be used.

<Softeners>

Likewise, examples of the softeners include low-molecular polyiosbutylene; polybutene; polyisoprene; polybutadiene; hydrogenated polyisoprene; hydrogenated polybutadiene; derivatives thereof that have a reactive group such as an OH group, a COOH group, or an epoxy group at one end or both ends thereof; process oils; naphthenic oil; castor oil; linseed oil; soybean oil; phthalic ester plasticizers, phosphoric ester plasticizers; and liquid aliphatic petroleum resins. One or more appropriate materials selected from these tackifiers can be used.

<Resin Material for Forming Substrate Layer>

Examples of resin material for forming substrate layer include homopolypropylene; block, random or other propylene polymers containing ethylene units as comonomer units; ethylene polymers such as low-density ethylene polymers, high-density ethylene polymers, and linear low-density ethylene polymers; polystyrene; polyesters; olefin polymers that are copolymers of ethylene and other monomer(s) such as ethylene/methyl methacrylate copolymers; styrene/isoprene/styrene block copolymers (SIS); styrene/butadiene/styrene block copolymers (SBS); styrene/isoprene block copolymers (SI); styrene/butadiene block copolymers (SB); styrene/ethylene-propylene/styrene block copolymers (SEPS); styrene/ethylene-butylene/styrene block copolymers (SEBS); styrene/ethylene-butylene-propylene block copolymers (SEP); styrene/ethylene-butylene block copolymers (SEB); styrene/ethylene-butylene/olefin crystal block copolymers (SEBC); olefin crystal/ethylene-butylene/olefin crystal block copolymers (CEBC); styrene/isobutylene/styrene block copolymers (SIBS); styrene/butadiene random copolymers (SBR); hydrogenated styrene/butadiene random copolymers (HSBR); ethylene/vinyl acetate copolymers (EVA); ethylene/propylene rubbers (EPR); and ethylene/propylene/α-olefin rubbers. In addition, examples of the resin materials for forming substrate layer further include thermoplastic polyesters (that can be used alone), homopolypropylene (random polypropylenes and block polypropylenes may also be used), and ethylene/vinyl alcohol copolymer (EVOH). The aforementioned thermoplastic urethanes and the acrylic block copolymers may also be used as the resin material for forming substrate layer. These resin materials may be used solely or as a mixture of two or more of them.

The resin material for forming substrate layer may contain an appropriate additive, if necessary.

In addition to those additives as mentioned above, examples of the additives that can be contained in the resin material for forming substrate layer include ultraviolet absorbers, heat-resistant stabilizers, fillers and lubricants. Types, number, and quantity of additives to be contained in the resin material for forming substrate layer can be appropriately set according to an objective.

<Ultraviolet Absorbers>

Examples of the ultraviolet absorbers include benzotriazole compounds, benzophenone compounds and benzoate compounds. In relation to an ultraviolet absorber content, an arbitrary, appropriate content can be adopted unless otherwise bleed out arises during formation of a multilayered film. Typically, 0.01 part by weight to 5 parts by weight of a ultraviolet absorber is contained with reference to 100 parts by weight of thermoplastic resin in the substrate layer.

<Heat-Resistant Stabilizers>

Examples of the heat-resistant stabilizers include hindered amine compounds, phosphor compounds and cyanoacrylate compounds. In relation to a heat-resistance stabilizer content, an arbitrary, appropriate content can be adopted unless otherwise bleed out arises during formation of a multilayered film. Typically, 0.01 part by weight to 5 parts by weight of a heat-resistant stabilizer is contained with reference to 100 parts by weight of thermoplastic resin in the substrate layer.

<Fillers>

Examples of the fillers include inorganic fillers such as talc, titanium oxide, calcium carbonate, clay, mica, barium sulfate, whisker and magnesium hydrate. A preferable average particle size of the filler is 0.1 μm to 10 μm. In relation to a filler content, 1 part by weight to 200 parts by weight of a filler is preferably contained with reference to 100 parts by weight of thermoplastic resin in the substrate layer.

In an embodiment, in the case of producing a pressure-sensitive adhesive sheet, at first, the resin material for forming pressure-sensitive adhesive layer and the resin material for forming substrate layer are respectively fed into a die 120 from respective separate extruders. The resin material for forming pressure-sensitive adhesive layer and the resin material for forming substrate layer fed into the die 120 are then extruded together through annular openings provided in the die 120 in such a way that the resin material for forming pressure-sensitive adhesive layer becomes an exterior layer. The reason why the resin materials are extruded in such a way that the resin material for forming pressure-sensitive adhesive layer becomes an exterior layer is to prevent interior surfaces of a resultant pressure-sensitive adhesive sheet from adhering to each other after the sheet has been folded between the stabilizers 200A and 200A.

As mentioned above, the inflation extrusion molding apparatus of pressure-sensitive adhesive sheet according to the present invention makes it possible to form various resin materials, including pressure-sensitive adhesive sheets, with high quality and without involvement of occurrence of wrinkles.

EXAMPLES

The inflation extrusion molding apparatus of the present invention is hereunder described specifically by reference to examples in which a pressure-sensitive adhesive sheet is taken by way of example. However, the inflation extrusion molding apparatus of the present invention is not limited to the following examples.

Example 1

Block polypropylene (WINTEC WFX6 manufactured by Japan Polypropylene Corporation) as a material for forming substrate layer was fed to a resin feed port 110H of a screw extruder 110 having a diameter of 60 mm. 100 parts by weight of a resin mixture composed of 75 parts by weight of styrene/ethylene-butylene/styrene block copolymers (SEBS) (G1657 manufactured by Kraton Polymers Ltd.) and 25 parts by weight of tackifier (ARKON P-125 manufactured by Arakawa Chemical Industries Ltd.) as a material for forming pressure-sensitive adhesive layer were fed to a resin feed port 110H of another screw extruder 110 having a diameter of 60 mm. The extruder for pressure-sensitive adhesive was operated at a revolution speed of 15 rpm, and the extruder for substrate was operated at a revolution speed of 140 rpm, so that the resin materials were poured into a die 120. The die 120 had a diameter of 400 mm, and the annular ejection opening was concentrically and doubly provided. A gap of each ejection opening was 3.0 mm. The respective resin materials were molded through coextrusion while a preset temperature of the extruder for pressure-sensitive adhesive was set to 220° C. on the average; a preset temperature of the extruder for substrate was set to 180° C. on the average; and a preset temperature of the die 120 was set to 220° C. The resin material 10 that had been molded through coextrusion and inflated into a cylindrical shape passed through a space between the stabilizers 200A and 200A, to thus be molded so as to become folded in a flattened elliptical shape. Employed stabilizers 200A and 200A are those shown in FIGS. 3A to 3D; in other words, a total of 12 air floating portions 20A; namely, three air floating portions 20A in the lateral direction and four air floating portions 20A in the longitudinal direction on each of the stabilizers.

As a result of the resin material having passed through the space between the stabilizers, two pressure-sensitive adhesive sheets, each of which measured 110 μm in thickness and 1350 mm in width, could be obtained. Surfaces of the respective sheets were free from wrinkles, and the respective sheets had a substantially uniform thickness. Thus, high quality pressure-sensitive adhesive sheets were produced.

Comparative Example

The stabilizers using rollers, which are described in connection with JP-A-2005-111980, were employed in comparative example. Specifically, each of the stabilizers included a first roll unit and a second roll unit that were symmetrically arranged so as to assume an inclination angle of 6° and that were also made of PTFE. In the first roll unit, 56 narrow-width rollers, each of which had a width of 17 mm and a roll diameter of 46 mm, were provided in a row, and the respective rollers were attached at a pitch of 55 mm such that a gap between the rollers came to 9 mm. The row was arranged in eight layers. In the second roll unit, 90 narrow-width rollers, each of which had a width of 12 mm and a roll diameter of 38 mm, were provided in a row, and the respective rollers were attached at a pitch of 50 mm such that a gap between the rollers came to 12 mm. The row was arranged in two layers. The first roll unit and the second roll unit ware arranged such that a gap therebetween came to 8 mm. The narrow-width rollers were arranged in a zigzag layout, and an angle of aperture θ was set to 24°. The same resin materials as that described in connection with example 1 was molded under the same conditions except use of the stabilizers including the narrow-width rollers arranged in a zigzag layout and an angle of aperture θ set to 24°. Two pressure-sensitive adhesive sheets, each of which measured 110 μm in thickness and 1350 mm in width could thereby be obtained.

However, surfaces of the respective sheets included irregular wrinkles.

As mentioned above, according to the present invention, there is obtained an inflation extrusion molding apparatus that easily folds resin material(s) into a flattened elliptical shape without involvement of occurrence of wrinkles on a surface thereof and that makes it possible to let areas of the resin material(s) having a different thickness spread.

While the present invention has been described in detail and with reference to specific embodiments thereof, it will be apparent to one skilled in the art that various changes and modifications can be made therein without departing from the scope thereof.

This application is based on Japanese patent application No. 2010-073371 filed Mar. 26, 2010, the entire contents thereof being hereby incorporated by reference.

What is claimed is:

1. An apparatus for inflation extrusion molding of pressure-sensitive adhesive sheet, said apparatus comprising:
    a plurality of extruders;
    a die into which a pressure-sensitive adhesive and a resin material extruded respectively from the plurality of extruders are respectively introduced and which extrudes from an ejection opening a cylindrical body comprising a plurality of resin material layers and inflated to a predetermined diameter in accordance with an inflation method; and
    two stabilizers facing each other at a predetermined angle through which the cylindrical body extruded from the die is passed to be deformed into a flattened elliptical shape having a predetermined width,
    wherein the stabilizers each have a plurality of air floating portions each of which blows air toward the cylindrical body and the flattened elliptical shaped body; and
    the stabilizers rotate in one direction around the central axis of the cylindrical body; and
    wherein the air floating portions each have an indentation formed at a surface of the stabilizer and an air outlet provided in proximity to a center of the indentation, whereby the air blown from said air outlets spreads over interiors of said indentations to act as a contact pressure to float the sheet.

2. The apparatus according to claim 1, wherein the surface of each stabilizer at which the air floating portions are provided is covered by a porous member.

* * * * *